(12) United States Patent
Lütze et al.

(10) Patent No.: US 9,948,072 B2
(45) Date of Patent: Apr. 17, 2018

(54) MOUNTING SYSTEM FOR ARRANGING ELECTRIC DEVICES, FOR EXAMPLE, ESPECIALLY IN SWITCHGEAR CABINETS

(71) Applicant: Friedrich Lütze GmbH, Weinstadt-Grossheppach (DE)

(72) Inventors: Udo Lütze, Kernen-Stetten (DE); Jürgen Lang, Ludwigsburg (DE); Virgil Ghizelea, Stuttgart (DE)

(73) Assignee: FRIEDRICH LUETZE GMBH, Weinstadt-Grossheppach (DE)

( * ) Notice: Subject to any disclaimer, the term of this patent is extended or adjusted under 35 U.S.C. 154(b) by 0 days.

(21) Appl. No.: 14/416,881

(22) PCT Filed: Jul. 25, 2013

(86) PCT No.: PCT/EP2013/002211
§ 371 (c)(1),
(2) Date: Jan. 23, 2015

(87) PCT Pub. No.: WO2014/015989
PCT Pub. Date: Jan. 30, 2014

(65) Prior Publication Data
US 2017/0141547 A1    May 18, 2017

(30) Foreign Application Priority Data
Jul. 25, 2012  (DE) .................... 10 2012 014 979

(51) Int. Cl.
A47F 7/00         (2006.01)
A47F 5/08         (2006.01)
(Continued)

(52) U.S. Cl.
CPC ............. *H02B 1/052* (2013.01); *A47B 96/06* (2013.01); *H02B 1/32* (2013.01); *A47B 2097/003* (2013.01)

(58) Field of Classification Search
CPC .......... H02B 1/052; H02B 1/32; H02B 1/202; H02B 1/05523; H02B 1/0523; H02B 1/34;
(Continued)

(56) References Cited

U.S. PATENT DOCUMENTS 3,686,805 A * 8/1972 Pofferi .................... E04F 19/06
                                                        52/220.3
4,760,509 A * 7/1988 Panagiotou ........... F21V 17/107
                                                         362/285
(Continued)

FOREIGN PATENT DOCUMENTS

DE   196 59 606 A1   7/2000
DE   199 08 350 A1   8/2000
(Continued)

*Primary Examiner* — Jennifer E. Novosad
(74) *Attorney, Agent, or Firm* — Wenderoth, Lind & Ponack, L.L.P.

(57) ABSTRACT

A mounting system (1) includes in switchgear cabinets a horizontal mounting strip (3) with a front face to which an electrical device (2) can be secured. The mounting strip (3) has a locking flange (63) on its rear side lying opposite the device (2) that is to be secured. The locking flange, onto which another component (65) of the mounting system (1) can be directly locked or can be indirectly secured by a lockable adapter element (66), extends in the longitudinal direction of the mounting strip (3).

15 Claims, 11 Drawing Sheets

(51) Int. Cl.
  *H02B 7/00* (2006.01)
  *H02B 1/052* (2006.01)
  *H02B 1/32* (2006.01)
  *A47B 96/06* (2006.01)
  *A47B 97/00* (2006.01)

(58) Field of Classification Search
  CPC .............. A47B 96/06; A47B 2097/003; A47B 2097/006; A47B 96/067; A47F 7/005; A47F 5/0846; A47F 5/08; A47F 5/0838; A47F 5/0853; F16L 3/00; F16L 3/02; F16L 3/14; H02G 3/00; H02G 3/0437; H02G 3/128
  USPC ..... 211/26, 94.01, 87.01, 26.2, 183; 248/73, 248/68.1, 65, 69, 74.1–74.5; 174/135, 95
  See application file for complete search history.

(56) References Cited

U.S. PATENT DOCUMENTS

| | | | | |
|---|---|---|---|---|
| 5,174,788 A * | 12/1992 | Herbert | .............. | H01H 85/2045 439/532 |
| 5,419,066 A * | 5/1995 | Harnois | .................. | G09F 3/204 40/649 |
| 5,721,672 A * | 2/1998 | Costa | ..................... | H02B 1/056 361/633 |
| 5,794,795 A * | 8/1998 | Stemmons | ............... | H02B 1/01 211/191 |
| 5,810,618 A * | 9/1998 | Barbier | ................... | H02B 1/052 439/532 |
| 5,950,974 A * | 9/1999 | Hoffmann | ............. | H02B 1/202 248/223.41 |
| 6,119,990 A * | 9/2000 | Kump | ................... | A47F 5/0068 211/57.1 |
| 6,199,705 B1 * | 3/2001 | Portner | ................. | A47F 5/0846 211/26 |
| 6,246,004 B1 * | 6/2001 | Faccin | ................... | H02B 1/202 174/135 |
| 6,398,149 B1 * | 6/2002 | Hines | ..................... | A47B 21/06 242/388.6 |
| 6,543,957 B1 * | 4/2003 | Raspotnig | .............. | H02B 1/052 403/286 |
| 6,935,062 B2 * | 8/2005 | Lowry | ................... | G09F 3/204 248/205.1 |
| 7,287,350 B2 * | 10/2007 | Fast | ....................... | G09F 3/0295 211/183 |
| 7,367,149 B2 * | 5/2008 | Fast | .......................... | G09F 3/16 40/649 |
| D745,368 S * | 12/2015 | Lutze | ............................ | D13/184 |
| 9,504,180 B2 * | 11/2016 | Lutze | ..................... | H02B 1/052 |
| 9,515,458 B2 * | 12/2016 | Lutze | ..................... | H02B 1/052 |
| 9,711,952 B2 * | 7/2017 | Lutze | ..................... | H02B 1/052 |
| 2001/0047971 A1 * | 12/2001 | Chance | .................. | A47F 5/0846 211/87.01 |
| 2003/0192845 A1 * | 10/2003 | Lawson | ................ | A47F 5/0846 211/94.01 |
| 2004/0173545 A1 * | 9/2004 | Canty | ....................... | G02B 6/4459 211/26 |
| 2004/0200791 A1 * | 10/2004 | Bostick | ................ | A47G 25/746 211/94.01 |
| 2005/0029208 A1 * | 2/2005 | Paiste | ....................... | A47F 7/00 211/85.6 |
| 2005/0067542 A1 * | 3/2005 | Zarn | ..................... | B63B 25/002 248/225.11 |
| 2005/0247653 A1 * | 11/2005 | Brooks | ................... | B25H 3/04 211/94.01 |
| 2006/0240683 A1 * | 10/2006 | Bre' | ........................ | H02B 1/052 439/16 |
| 2006/0240707 A1 * | 10/2006 | Bre' | ........................ | H02B 1/052 439/532 |
| 2007/0056921 A1 * | 3/2007 | Lo | ........................ | A47B 95/008 211/94.01 |
| 2007/0256996 A1 * | 11/2007 | Jackie | .................... | A47F 5/0846 211/94.01 |
| 2010/0122963 A1 * | 5/2010 | Costa | .................... | A47G 25/746 211/94.01 |
| 2015/0181742 A1 * | 6/2015 | Lutze | ..................... | H02B 1/052 211/26 |
| 2015/0188298 A1 * | 7/2015 | Lutze | ..................... | H02B 1/052 211/26 |
| 2017/0141547 A1 * | 5/2017 | Lutze | ..................... | H02B 1/052 |

FOREIGN PATENT DOCUMENTS

| | | |
|---|---|---|
| DE | 103 50 465 A1 | 6/2005 |
| DE | 20 2008 015 309 U1 | 8/2009 |
| DE | 20 2010 011 620 U1 | 10/2010 |
| EP | 0 109 881 A1 | 5/1984 |
| EP | 2 400 610 A2 | 12/2011 |
| JP | S59-89919 U | 5/1984 |

* cited by examiner

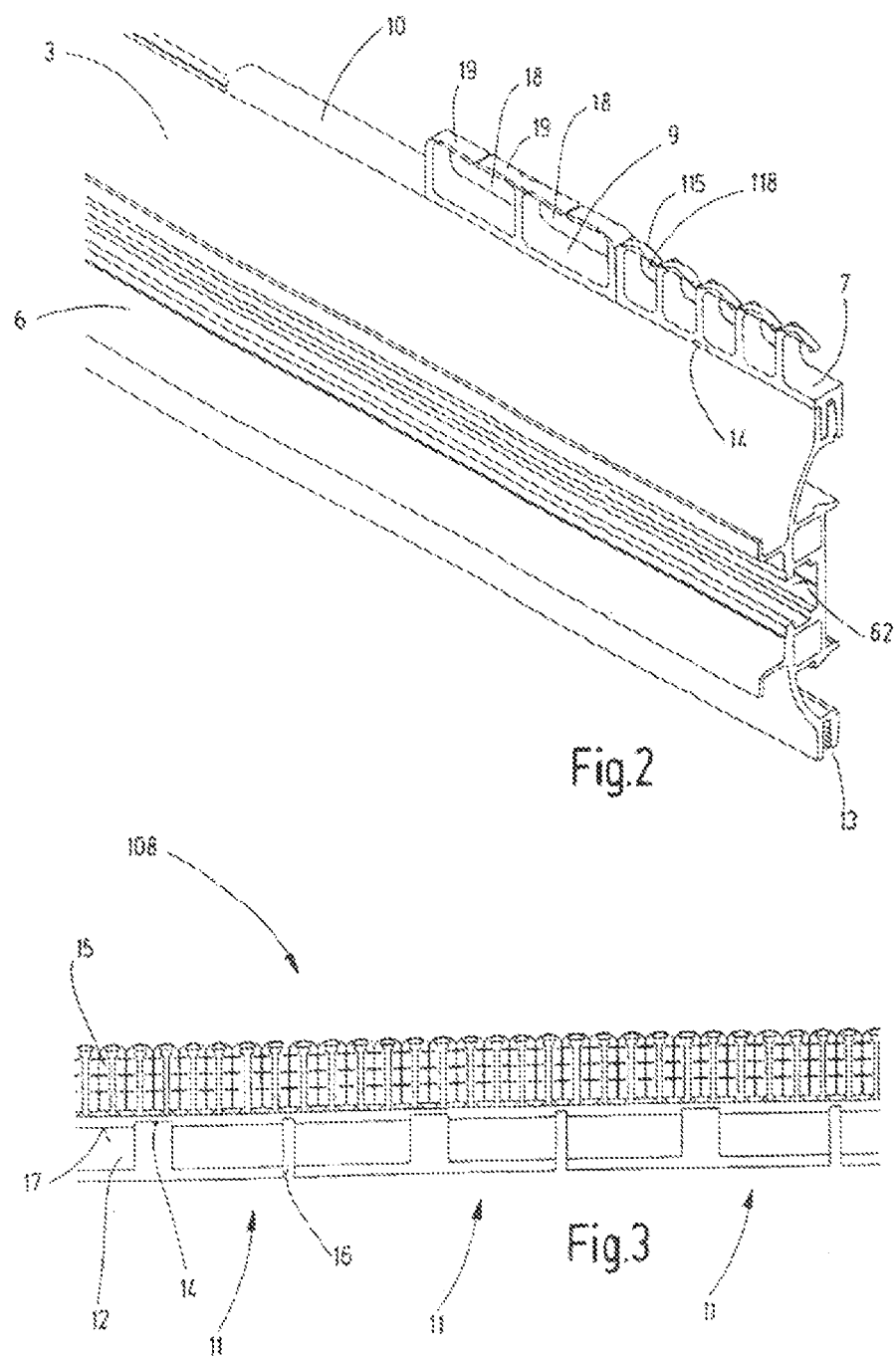

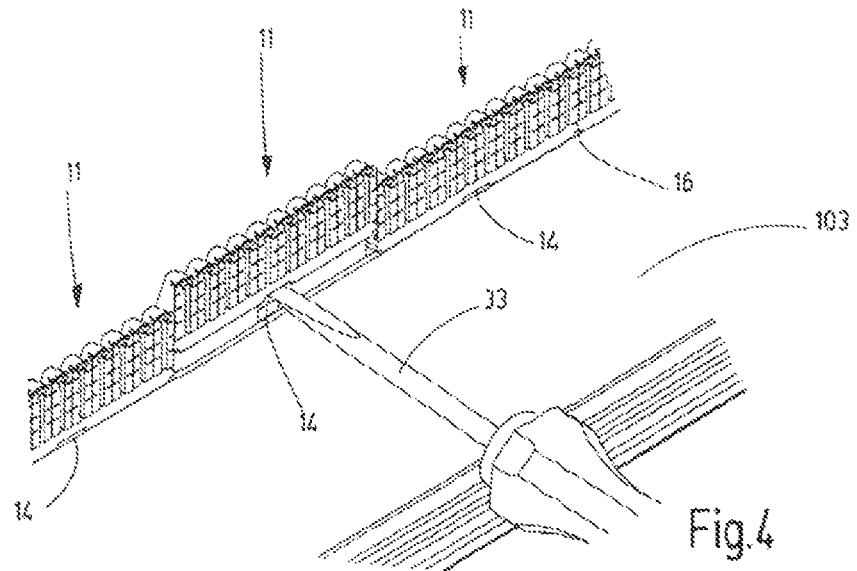
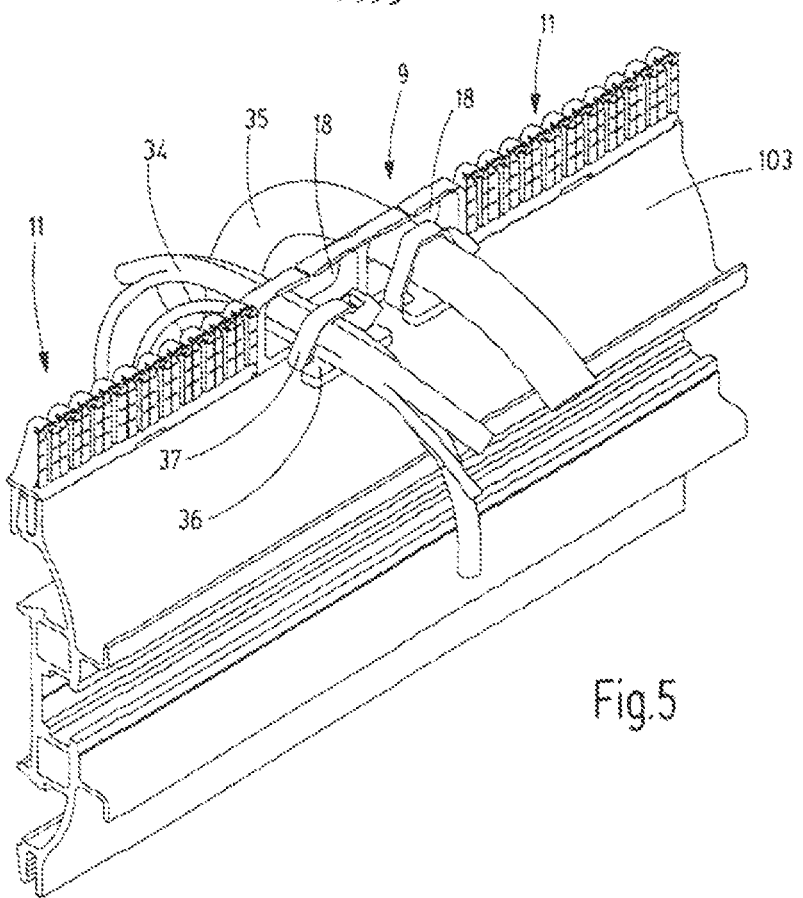

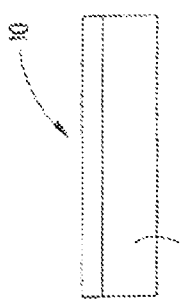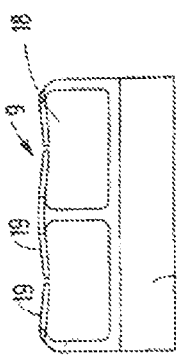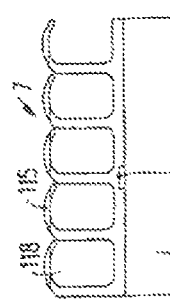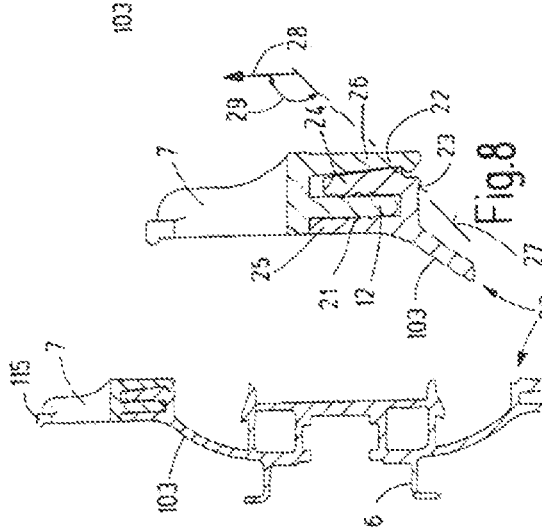

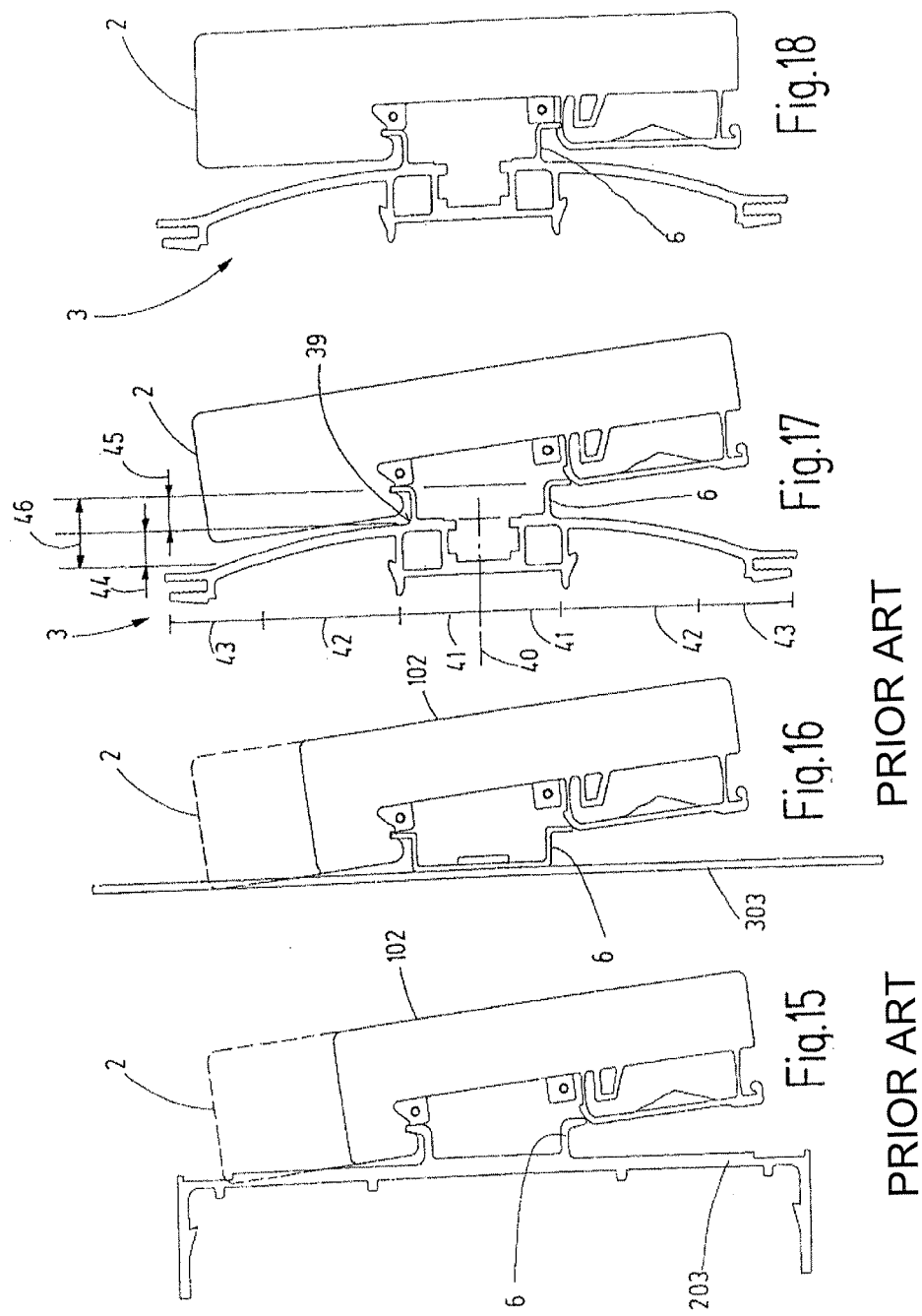

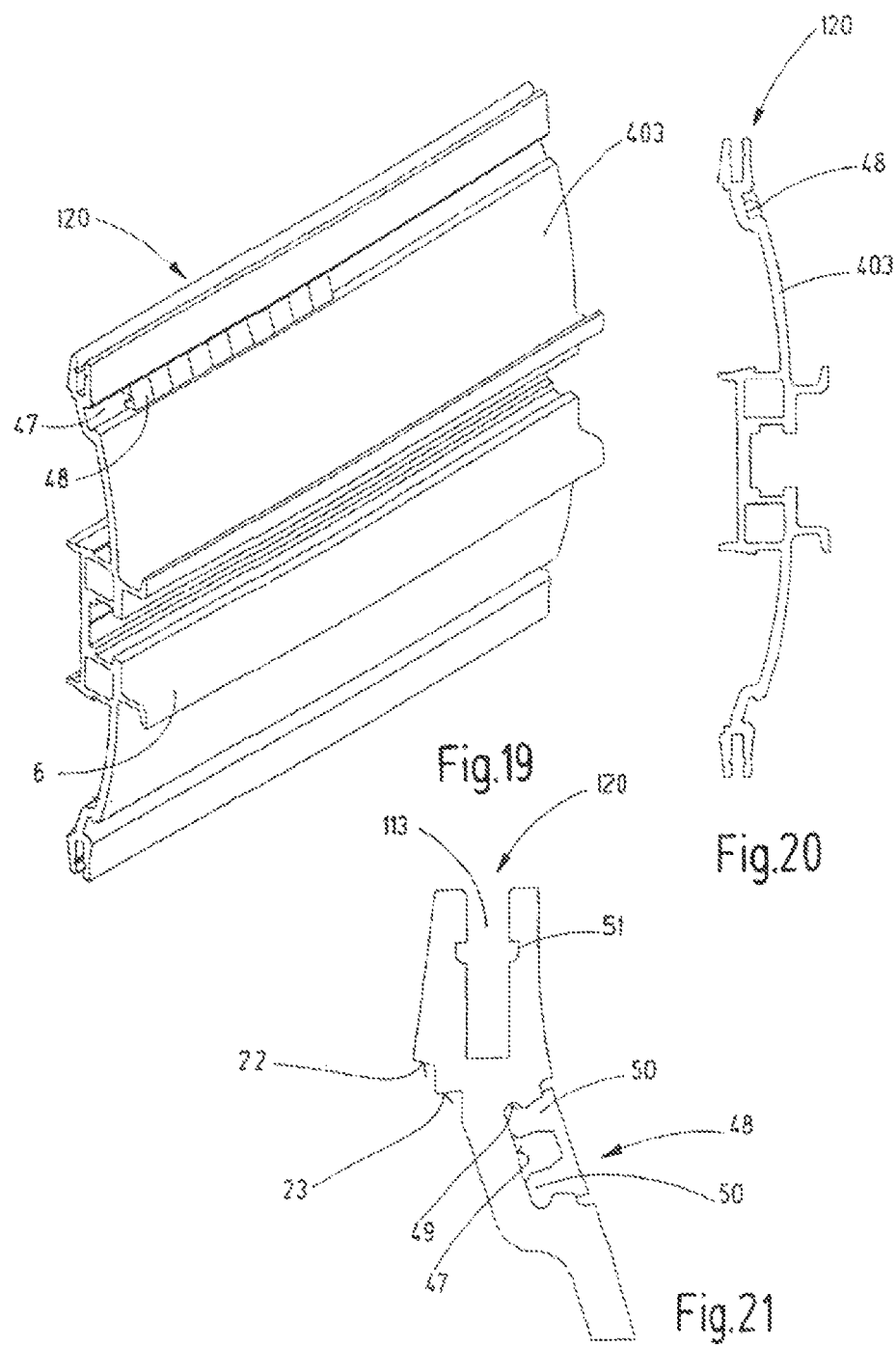

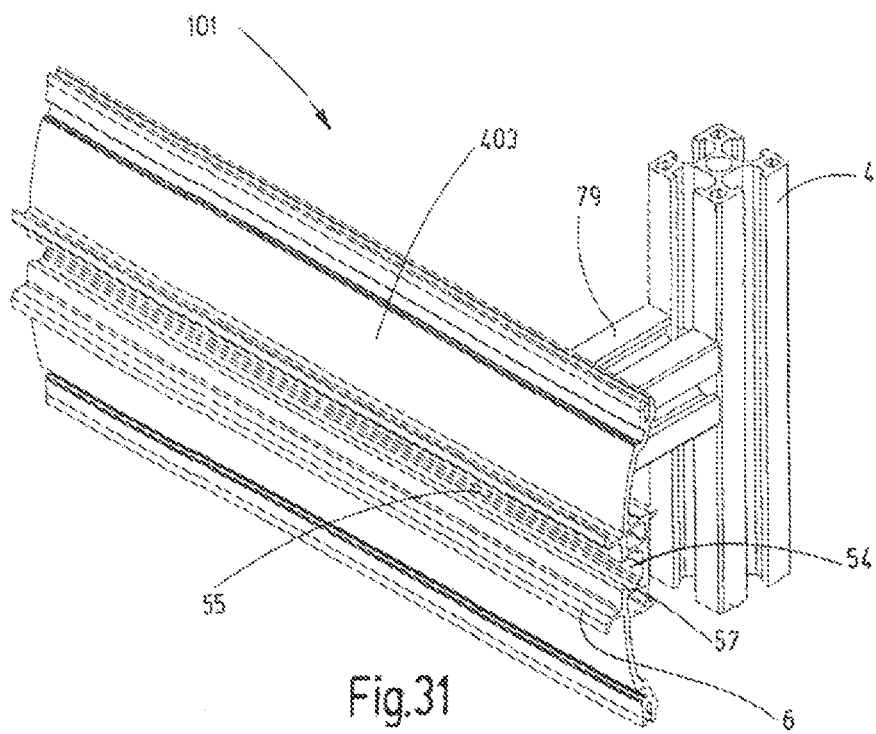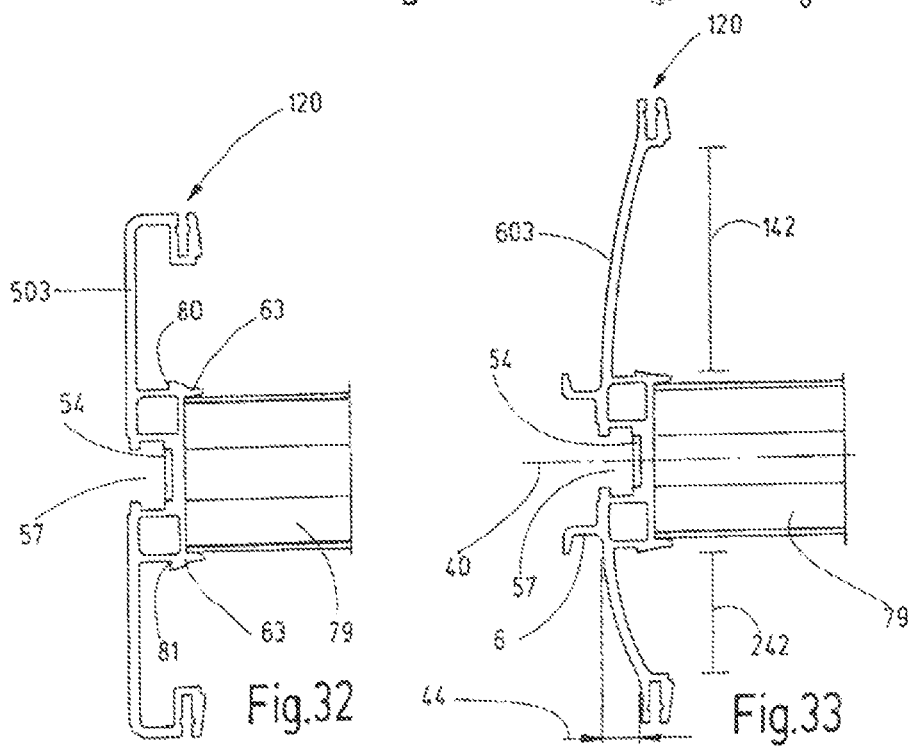

MOUNTING SYSTEM FOR ARRANGING ELECTRIC DEVICES, FOR EXAMPLE, ESPECIALLY IN SWITCHGEAR CABINETS

FIELD OF THE INVENTION

The invention relates to a mounting system for the arrangement of electric devices, for example, in electrical enclosures, particularly switchgear cabinets.

BACKGROUND OF THE INVENTION

In industrial control technology, electric devices are frequently disposed in electrical enclosures, or switch boxes. The individual devices are disposed on mounting rails, such as a top hat rail, and can be connected to one another in series. Subsequently, the devices are hard-wired. A comb-shaped organizer is attached to the mounting strip to which the mounting rail is attached, to organize the connection lines of the devices. An associated mounting system is offered by the applicant, Friedrich Lütze GmbH, in 71384 Weinstadt, Germany and is known, for example, from DE 199 08 350 A1, DE 103 50 465 A1, DE 20 2010 011 620 U1, and DE 20 2008 015 309 U1.

DE 198 59 606 A1 discloses a quick-assembly hard-wiring system, comprising a mounting frame, to which the devices are attached, and device islands that can be attached to the mounting frame, which have top hat rail mounting rails.

SUMMARY OF THE INVENTION

An object of the present invention is providing an improved mounting system having improved performance characteristics, in particular, which can be implemented in a versatile manner and is, nevertheless, simple in terms of the manipulation and installation thereof. This mounting system, in a simple manner, can use the space available for the installation more effectively.

In one embodiment the mounting system has at least one, preferably horizontal, mounting strip, onto which at least one device can be attached. The mounting strip optionally has a mounting rail, preferably designed as an integral element thereof, to which the device can be affixed in a releasable manner, such as a standardized top hat rail, or a top hat rail substantially corresponding to a norm. One or more mounting strips can be affixed to a support device, in particular on profile bars that are at a right angle to the mounting strips, and are preferably vertical, and which form a mounting frame that can be pre-assembled and subsequently inserted, for example, in an electrical enclosure.

The mounting strip has at least one locking flange extending in the longitudinal direction of the mounting strip on its back surface lying opposite the device that can be attached to it. If applicable, the mounting rail, on which further components of the mounting system, such as a cable bundle element, can be snapped in place directly, or attached indirectly, through the use of an adapter element that can be snapped in place.

By way of example, cable retainers can be attached to the back surface of the mounting strip in this manner. By the cable retainers, the connection lines for the devices attached to the front surface of the mounting strip can be guided on the back surface.

The snapping in place can be releasable, in particular without tools, or only releasable with a tool, or it can be non-releasable. Various further components of the mounting system can have different designs in this regard. Thus, for example, components such as cable retainers that can be snapped directly onto the locking flange can be releasable without tools. In contrast, adapter elements, for example, can be snapped onto the locking flange such that they cannot be released, or, in any case, can only be released with a tool.

The mounting strip can form the mounting rail on the front surface and/or the locking flange on the back surface, as an integral element thereof. The mounting strip can be formed by a profile bar cut to length, and can be made of aluminum or an alloy containing aluminum, for example.

In one embodiment, the locking flange has a self-locking locking edge, in particular a locking edge with an undercut. As a result, an unintentional release, in particular, of the components of the mounting system attached to the locking flange, is reliably prevented.

In one embodiment, the mounting strip has two locking flanges, which are spaced apart from one another in relation to the longitudinal axis of the mounting strip, but which run parallel to one another. The further components of the mounting system, or the adapter elements, can be snapped in the manner of clamps onto the locking flanges. The two locking flanges can, like the mounting rails on the front surface, be designed so as to be symmetrical in relation to a central plane. The central plane can also form a plane of symmetry for the entire mounting strip.

In one embodiment, the mounting system comprises a first additional component for bundling connection lines for the devices disposed on the front surface, which connection lines run on the back surface of the mounting strip. The first additional component has, as integral elements, both a connecting section that can be snapped onto the locking flange and at least one cable guide for receiving the connection lines. The first additional component can be individually manufactured as an injection molded part, or alternatively, can be cut to length from a profile bar. The first additional component can be made of plastic.

In one embodiment, the cable guide is bordered by a least one resilient, deflectable leg. The deflection of that leg allows for connection lines to be inserted in the cable guide. The cable guide can have a substantially rectangular or square cross-section, preferably with rounded corners or edges, respectively. The deflectable leg can be disposed on one side of the cable guide, which side adjoins the side of the cable guide that has the connecting section for snapping onto the locking flange.

In one embodiment, the first additional component has, as an integral element, a plurality of cable guides for bundling connection lines extending on the back surface of the mounting strip. The cable guides can be disposed so as to be symmetrical to a plane of symmetry for the mounting strip. The cable guides can be of a uniform size. The separating wall between the cable guides can extend parallel to the plane of symmetry for the mounting strip. As a result, when the first additional component is in the installed state, the connection lines passing through it on the back surface, over the upper or lower side of the mounting strip, can be guided in separate cable guides of the first additional component.

In one embodiment, the mounting system has an adapter element, which can be snapped onto the locking flange, and which has a mechanical interface for the attachment of further components of the mounting system on the back surface of the mounting strip. By way of example, the adapter element can have holes for fasteners allowing the adapter element to be connected to further components of the mounting system, such as a cable channel or a base for a cable clip. The adapter element can be formed, for example, by a metal clamp. The inherent rigidity or clamping shape of the metal clamp can be such that the adapter element cannot be released, in any case, without a tool. By way of example, the adapter element can engage with an undercut in the locking flange.

In one embodiment, a receiving space is formed between the adapter element and the locking flange, for receiving a fastener for attaching a further component of the mounting system to the adapter element. The receiving space can be formed by the shape of the adapter element and/or by the shape of the locking flange.

The devices that can be attached to the mounting strip can, for example, be electric devices, such as power supplies, fuses, controls, input/output assemblies, interface units, temperature converters, analog/digital converters, or the like. Alternatively, or in addition thereto, the device can also have non-electric components, such as optical components or pneumatic components, for example.

The features specified in the claims and in the description may be substantial to the invention thereby, in and of themselves, or in any arbitrary combination thereof.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 2 is an enlarged, partial perspective view of the mounting strip of FIG. 1;

FIG. 3 is a front view of a first organizing segment according to an exemplary embodiment of the invention;

FIG. 4 is a perspective view of a mounting strip with the organizing segment of FIG. 3 inserted therein;

FIG. 5 is a perspective view of the mounting strip of FIG. 4, with an organizing segment exchanged therein;

FIG. 6 is a front view of an organizing segment according to another exemplary embodiment of the invention;

FIG. 7 is a side view in section of the mounting strip, with the organizing segment of FIG. 6 attached thereto;

FIG. 8 is an enlarged and partial side view in section of the mounting strip and organizing segment of FIG. 7;

FIG. 9 is a front view of an organizing segment according to a further exemplary embodiment of the invention;

FIG. 10 is a side view in section through the mounting strip, with the organizing segment depicted in FIG. 9 attached thereto;

FIG. 11 is an enlarged and partial side view in section of the mounting strip and organizing segment of FIG. 10;

FIG. 12 is a front view of an additional component according to an exemplary embodiment of the invention;

FIG. 13 is a side view in section cut through a mounting strip with the additional component depicted in FIG. 12 attached thereto;

FIG. 14 is an enlarged, partial side view in section of the mounting strip and additional component of FIG. 13;

FIG. 15 is a side view of a mounting strip according to the prior art;

FIG. 16 is a side view of a control panel according to the prior art;

FIG. 17 is a side view of a mounting strip during the attachment of a device according to an exemplary embodiment of the invention;

FIG. 18 is a side view of the mounting strip with a device attached thereto of FIG. 17;

FIG. 19 is a perspective view of a mounting strip according to an exemplary embodiment of the invention;

FIG. 20 is a side view of the mounting strip depicted in FIG. 19;

FIG. 21 is an enlarged, partial side view of the mounting strip of FIG. 20;

FIG. 31 is a perspective view of a mounting system according to a further exemplary embodiment of the invention;

FIG. 32 is a side view of a mounting strip without a mounting rail according to a still further exemplary embodiment of the invention; and FIG. 33 is a side view of an asymmetrical mounting strip according to yet another exemplary embodiment of the invention.

DETAILED DESCRIPTION OF THE INVENTION

Figure 1:
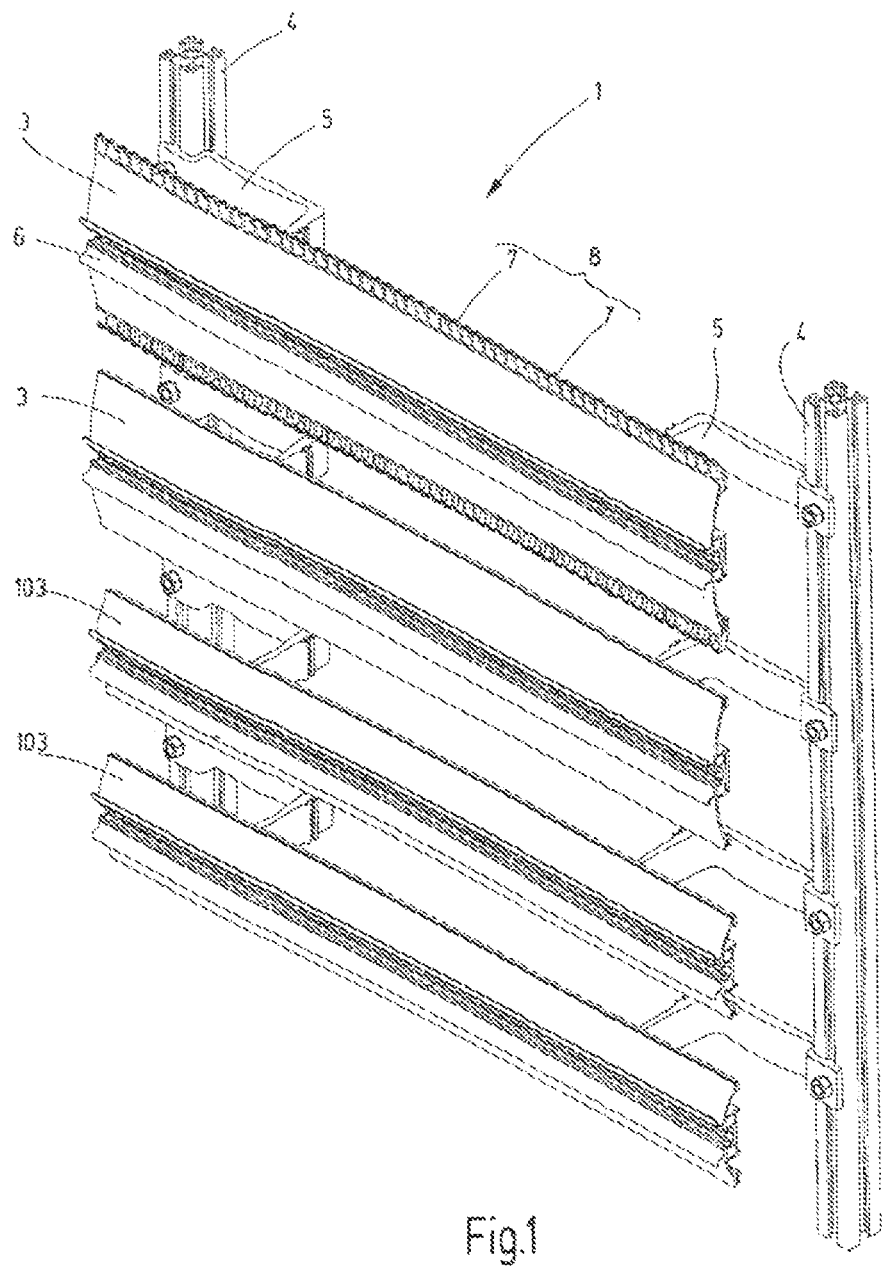
FIG. 1 is a perspective view of a mounting system according to an exemplary embodiment of the invention.

FIG. 1 is a perspective view of an exemplary embodiment of a mounting system 1 having a total of four horizontal mounting strips 3, 103, onto each of which at least one device 2 can be attached (FIG. 17). The two lower mounting strips 103 have a shorter lateral extension than the two upper mounting strips 3. The mounting strips 3, 103 are each connected to a vertical profile bar 4 at or close to both ends, by way of example at up to 200 mm, and in particular up to 125 mm from their two ends, by a mounting bracket 5 or some other connecting element 79 (FIG. 31). In each case, the mounting strips 3, 103 form, collectively with the profile bar 4, a mounting frame, which can be pre-assembled, and can be subsequently installed in an electrical enclosure, in the state depicted in FIG. 1, or with devices 2 and the connection lines 34, 35 thereof (FIG. 5) already attached thereto as well. The mounting strips 3, 103 each have a mounting rail 6, to which the devices 2 are attached, this being, in this exemplary embodiment, a standardized top hat rail, or a top hat rail substantially corresponding to a norm. The height of the top hat rail is 7.5 mm.

An organizing segment 8 is attached to one longitudinal edge of each upper mounting strip 3 in FIG. 1, which segment is comprised of a plurality of identical organizing elements 7. Individual or numerous organizing segments 7 of the organizing segment 8 can be detached, and removed from the organizing segment 8, or the mounting strip 3, respectively, thus leaving a gap, or can be replaced by another organizing segment 9 (FIG. 2), 11 (FIG. 3), or by a group of other organizing segments 9, 11.

FIG. 2 shows a mounting strip 3 in an enlarged depiction. FIG. 3 shows an organizer 108, comprised of a plurality of organizing segments 11, designed as integral elements thereof, and disposed behind one another. Instead of the integral design, the organizing segments 11 can also have links on each of their ends, by which the organizing segments 11 can be linked to one another in a releasable manner. The organizer 108 can be produced in pre-definable lengths of basically 1 meter or 2 meters, for example, or can be produced as continuous strips.

Each organizing segment 11 has a strip-shaped attachment section 12, which can be inserted in a receiving device 20 that is disposed on the longitudinal edges of the mounting strip 3 and exhibits a groove 13 (FIG. 7). A central groove 14, with respect to the longitudinal extension, is formed in the attachment section 12, extending in the insertion direction. The end of groove 14 forms a tool engagement surface, which remains accessible even in the inserted state, and in which a tool 33 (FIG. 4) can be inserted in order to release the organizing segment 11.

In an integrated manner, together with the attachment section 12, the organizing segment 11 forms preferably resilient, deflectable organizing elements 15, between which connection lines 34, 35 for the device 2 can be inserted and can be fixed in place in an organized manner as a result. Target separation points 16, at which the organizing segments 11 can be separated, are formed by incisions in the attachment section 12. The incisions extend thereby beyond a stop angle 17 formed by the organizing segment 11, up to which point the organizing segment 11 can be inserted in the groove 13. As a result, the position of the target separation point 16 is still visible in the inserted state. A separating cut can be made from the direction of the organizing element 15.

The organizing segment 9 has two receiving channels 18, extending in each case over one half of the length of the organizing segment 9, for the connection lines 34, 35 that are to be organized. Two legs 19 of the organizing segment 9, lying opposite the mounting strip 3, or the attachment section 12, respectively, can be deflected in a resilient manner, in order to insert the connection lines 34, 35 that are to be organized in the receiving channel 18. In contrast thereto, the organizing segment 7 has a plurality of organizing elements 115, five in this exemplary embodiment, each of which has an elastic, deformable hook section for closing the receiving channel 118. Further organizing segments can also have receiving channels 18, 118 having a different design, in particular, they can have receiving channels 18, 118 of different sizes, such as one or more larger receiving channels 18 that are identical or similar to the organizing segment 9, and one or more smaller receiving channels 118 that are identical or similar to the organizing segment 7, for example. In one embodiment the length of the individual receiving channels 18, 118 is at least 5%, in particular at least 8%, and preferably at least 10% of the entire length of the organization segment 7, 9. The additional component 10 of the mounting system 1 is an edge protection element. The organizing segments 7, 9, as is the case with the additional component 10, are of a consistent length, 50 mm in this exemplary embodiment.

FIG. 4 is a perspective view of a mounting strip 103, having an organizer formed by a series of organizing segments 11 inserted in the groove 13. An organizing segment 11 is separated there by two cuts at the target separating points 16. The separated organizing segment 11 can be released and removed from the mounting strip 103 by inserting a tool 33, such as the blade of a slotted screwdriver, for example.

FIG. 5 is a perspective view of the mounting strip 103 in FIG. 4, wherein, in place of the detached organizing segment 11 in FIG. 4, an organizing segment 9 having two large receiving channels 18 is inserted. A bundle of connection lines 34, or one connection line 35 having a large cross-section, is inserted in each channel.

In order to better secure the connection lines 34, 35, the organizing segment 9 has a retaining section 36, protruding transverse to the longitudinal direction, in particular protruding on the front surface of the mounting strip 103 with the mounting rail 6. The organizing segment 9 has one retaining section 36 for each receiving channel 18. The retaining section 36 has a T-shape at its free end, for a better securing of a retainer 37, which can be a cable tie.

FIGS. 6, 9 and 12 show the organizing segments 7, 9, as well as the additional component 10. The organizing segment 9 and the additional component 10 can be attached to the mounting strip 3 such that they cannot be released, for which reason these components 9, 10 do not exhibit a tool engagement surface 14.

FIG. 7 shows a section through a mounting strip 103 with an organizing segment 7 attached thereto. FIG. 8 shows a detail from FIG. 7 in an enlarged depiction, in the region of the connection of the organizing segment 7 to the mounting strip 103. The receiving device 20 extends along the longitudinal axis of the mounting strip 103, and is formed as an integral part of the mounting strip 103, in which the organizing segment 7 can be inserted. The receiving device 20 has, aside from the groove 13, in which there are numerous additional grooves 21 or flutings extending in the lateral walls thereof in the longitudinal direction of the mounting strip 103, two locking flanks 22, 23 on an exterior surface of the receiving device 20, which extend in the longitudinal direction of the mounting strip 103, and which are formed as an integral part thereof. In particular, the two locking flanks 22, 23 are formed on an exterior surface of a wall 24 bordering the groove 13, which is set back in the lateral direction in relation to the opposite wall 25, which likewise borders the groove 13. On the exterior surface, the wall 24 has a surface extending at a slant to the direction of insertion for the organizing segment 7 and in particular at a slant to the groove 13. As a result of the slant, a deflection of the lock 26 during the insertion of the organizing segment 7 is made possible with less insertion force.

The organizing segment 7, which forms a component of a first type for the mounting system 1, has an associated lock 26 formed by a leg that extends nearly parallel to the attachment section 12 in its un-deformed initial state. Lock 26 can be deflected in a resilient manner in comparison thereto, in the proximity of the free end of which a locking flank 27 of the first type is formed, which lock flank forms an angle 29 of greater than 90° with the direction 28 of the pulling force. As a result, the locking of it can be released by pulling force alone. For a simplified manipulation thereof, the releasing force can be applied by a slotted screwdriver 33 that can be inserted in the tool engagement surface 14.

FIG. 10 shows a section through a mounting strip 103 having an organizing segment 9 attached thereto. FIG. 11 shows a detail of FIG. 10 in an enlarged depiction, in the region of the connection of the organizing segment 9 to the mounting strip 103. The organizing segment 9 forms a component of the second type of the mounting system 1, having an associated locking means 126, which has a locking flank 30 of the second type, forming an angle of less than 90° with the direction 28 of the pulling force. As a result, locking flank 30 cannot be released by pulling force alone, but instead is self-locking. Accordingly, the organizing element 9 is attached to the mounting strip with greater stability, corresponding to the greater receiving channel 18 for the insertion of greater and heavier connection lines 34, 35.

FIG. 13 shows a section cut through a mounting strip 103 having an additional component 10 attached thereto. FIG. 14 shows a detail of FIG. 13, in an enlarged depiction, in the region of the connection of the additional component 10 to the mounting strip 103. The additional component 10 is an edge protection element, which has a surface 32 on its surface facing away from the mounting strip 103 that extends in a convex manner over an angular range of 180°, but deviates, however, from a circular shape. The additional component 10 can be produced, for example, as an extrusion component made of a plastic, and cut to size, on an individual basis, to the desired length. The additional component 10 does not have a tool engagement surface 14, such that, although a releasing of the locking by a pulling force in the direction indicated by 28 is fundamentally possible, due to the materials used and the structural design, this release is not possible by manually, or can only be achieved with a great deal of force. This arrangement prevents the additional component 10 from being able to be unintentionally released from the mounting strip 103.

In one embodiment, with those organizing segments 7, 11, or components in which the tool engagement surface 14 is visible when in the state in which they are attached to the mounting strip, the locking is not self-locking, but instead, can be released by pulling force alone. In particular, these organizing elements 7, 11 have a lock 26 with a locking flank 27 of the first type, by which the locking can be released by pulling force alone.

FIGS. 15 and 16 show a side view of a mounting strip 203 according to the prior art, or on a control panel 303 according to the prior art, respectively, each of which has a mounting rail 6 having a height of 7.5 mm, by way of example. Due to the relatively low height of the mounting rail 6, devices 2 having a comparatively greater structural height cannot be attached thereto. Instead, only those devices 102 that exhibit, at least on one side, a reduced structural height can be attached thereto. In order to resolve this problem of being able to also attach large devices 2 to mounting rails 6 having a comparably lesser structural height, a mounting strip 3, preferably constructed so as to be symmetrical to a central plane 40, has a third section 43, spaced apart from the mounting rail 6, in addition to a first, preferably central section 41, in which the mounting rail 6 is also formed. This third section has a greater vertical spacing 44 from the base point 39 of the mounting rail 6 than a second section 42, disposed between the first section 41 and the third section 43, at its end closest to the mounting rail 6, in particular at its end bordering the mounting rail 6.

In the embodiment in FIGS. 17 and 18, this ability is achieved by a convex curvature of the mounting strip 3, in particular in its second section 42. The convex curvature extends over an angular range of basically 15°. The radius of the convex curvature is basically four times the lateral extension of the curved second section 42. The vertical spacing 44 between an end of the second section 42 facing the third section 43 and an end of the second section 42 facing the first section 41 corresponds thereby to approximately the height 45 of the mounting rail 6, such that the overall height 46 for the attachment of the device 2 to the mounting rail 6 is basically twice the height 45 of the mounting rail 6. As is shown in FIGS. 17 and 18, despite the relatively low height 45 of the mounting rail 6, devices 2 having a larger structural shape can be attached to the mounting strip 3 without difficulties.

FIG. 19 shows a perspective view of a mounting strip 403. FIG. 20 shows a side view of the mounting strip 403 in FIG. 19. FIG. 21 shows a detail from FIG. 20 in an enlarged depiction, in the region of a groove 47 formed as an integral part of the mounting strip 403, for the releasable, locking insertion of designation labels 48. The groove 47 has an undercut 49 on both sides. In each case, a resilient, deflectable leg 50 of the designation label 48 engages the undercuts in a locking manner. The groove 47 is disposed in the region of the third section 43 of the mounting strip 403, or in an end of the second section 42 of the mounting strip 403 that is distanced from the first section 41. As a result, the designation label 48 can be read even when a device is attached to the mounting strip 403. The designation label 48 can, for example, indicate a connection line 34, 35 which is guided, adjacent to the designation label 48, from the back surface to the front surface of the mounting strip 403, or a device 2 disposed on the mounting rail, in the region of the designation label 48.

Organizer 8 or other components 10 of the mounting system 1 can be placed in the receiving device 120 and, in particular, can be inserted in the insertion groove 113. At least one of the walls that border the insertion groove 113 has one or more recesses 51 or flutings, which preferably extend in the longitudinal direction of the insertion groove 113, for example, for the non-releasable locking in place of a component of the mounting system. The component can be placed in the receiving device 120, or can be inserted in the insertion groove 113, respectively. On the exterior thereof, the receiving device 120 has a first locking flank 22 and a second locking flank 23. The first, non-blocking locking flank 22 exhibits a smaller spacing to the free end of the receiving device 120 relative to the blocking second locking flank 23.

Figure 22:
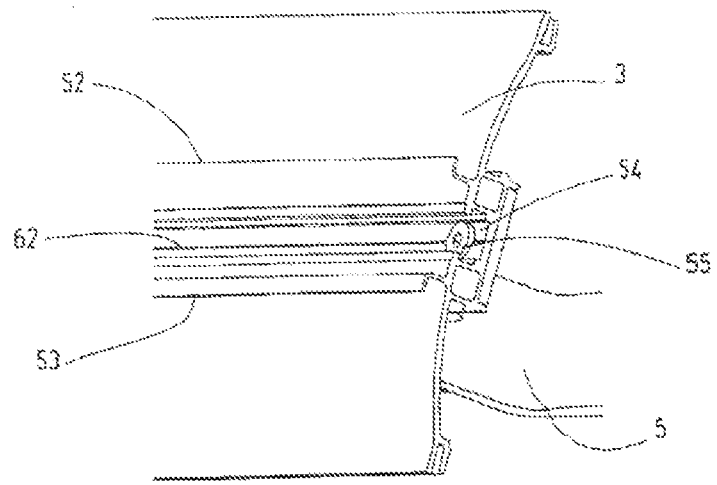
FIG. 22 is a perspective view of one end of a mounting strip according to an exemplary embodiment of the invention.
Figure 23:
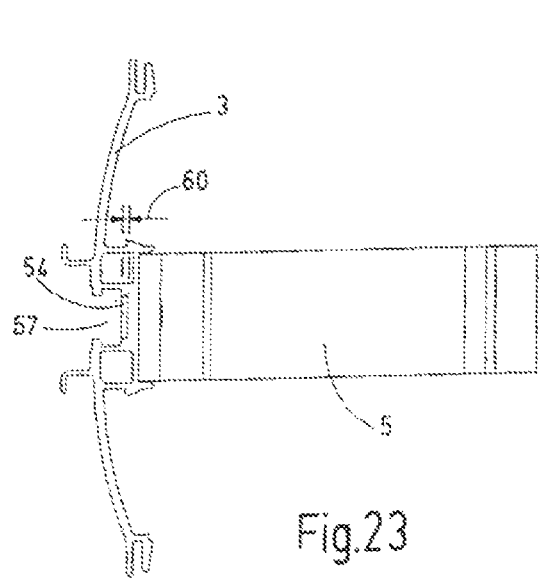
FIG. 23 is a side view of the mounting strip depicted in FIG. 22.
Figure 24:
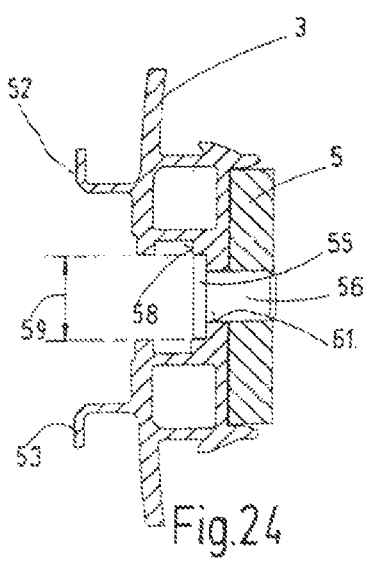
FIG. 24 is an enlarged, partial side view of the mounting strip of FIG. 23.

FIG. 22 is a perspective view of one end of the mounting strip 3, with the connection to the mounting bracket 5. FIG. 23 is a side view of the mounting strip 3 shown in FIG. 22. FIG. 24 shows a detail of FIG. 23 in an enlarged depiction, in the region of the connection between the mounting strip 3 and the mounting bracket 5. The mounting strip 3 has a groove 54 between the two support legs 52, 53 of the mounting rail 6, extending in the longitudinal direction of the mounting strip 3, and preferably in the middle thereof. Groove 54 receives a head 55 of a fastener 56, in particular, the head of a flat-head screw. As a result, the head 55 does not extend into the region between the two support legs 52, 53 when the mounting strip 3 is connected to the mounting bracket 5, and thus does not impede the attachment of the device 2.

In the exemplary embodiment, the mounting strip 3 has a sliding nut channel 57 between the two support legs 52, 53 extending in the longitudinal direction of the mounting strip 3. The groove 54 is formed in the bottom surface 58 of the sliding nut channel 57. The head 55 of the fastener 56 does not extend above the bottom surface 58 of the sliding nut channel 57, or into the sliding nut channel 57, respectively, when in the connected state. As a result, it is possible to insert one or more sliding nuts into the sliding nut channel 57 even when the fastening means 56 has been installed, in particular in a section of the sliding nut channel 57 that is bordered on both sides by fastening means 56 as well.

The width 59 of the groove 54 is less than 50% greater than the width of the head 55 of the fastening means 56, in particular less than 25%, and preferably less than 10%. The depth 60 of the groove 54 is less than 50% greater than the height of the head 55 of the fastening means 56, in particular less than 25% and preferably less than 10%. The width 59 of the groove is less than 90% of the width of the sliding nut channel 57, in particular less than 80%, and in the embodiment example, approximately 75%. The width 59 of the groove 54 corresponds basically to the width of the opening of the sliding nut channel 57 facing the support legs 52, 53. The depth 60 of the groove 54 is less than 150% of the depth of the sliding nut channel 57, in particular less than 100%, and preferably less than 50%.

The fastener 56 is a flat-head screw in the exemplary embodiment, which fastener is placed in a through hole 61 in the mounting strip 3, and is screwed into a threaded hole in the mounting bracket 5. The through-hole 61 can be placed arbitrarily at a point in the mounting strip 3 suited for the connection of the mounting strip 3 to the mounting bracket 5. For this, the mounting strip 3 has a preferably V-shaped trough 62 formed in the middle of the bottom surface of the groove 54, extending in the longitudinal direction of the mounting strip 3, serving as a centering aid.

Figure 25:
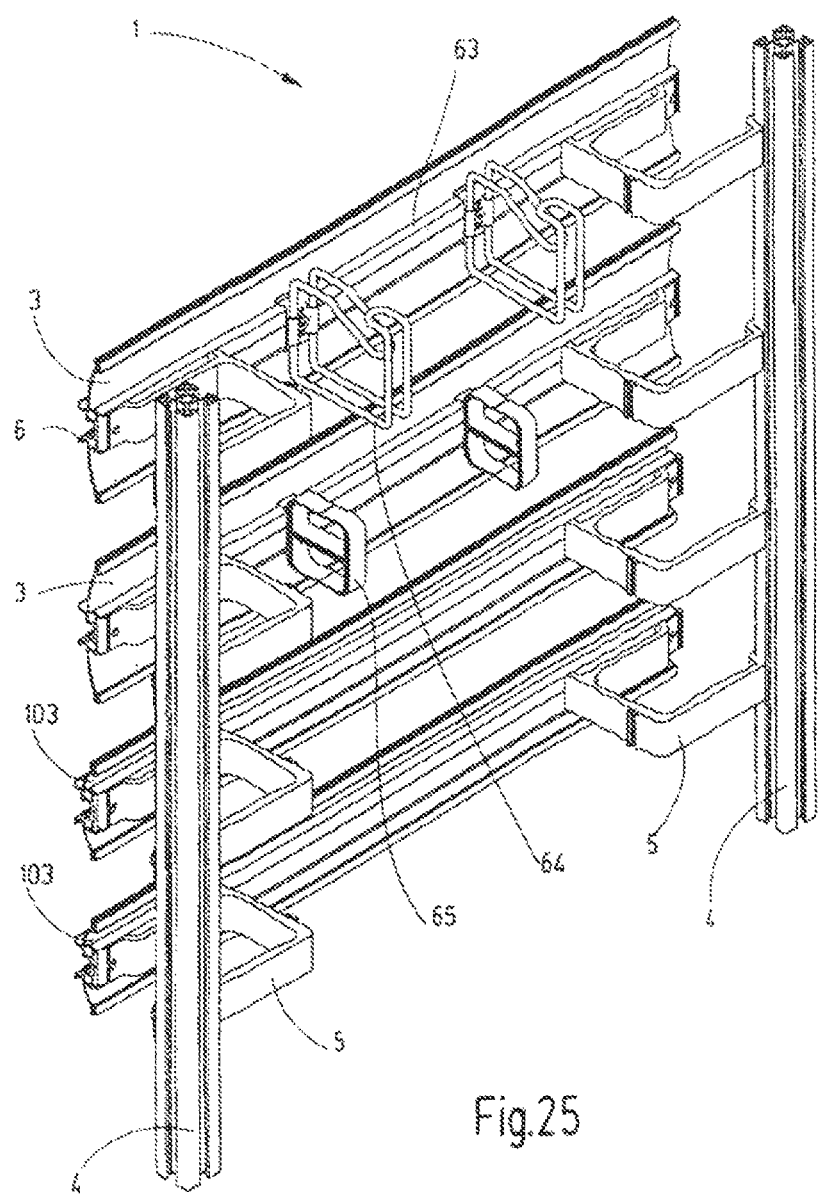
FIG. 25 is a perspective view of the back surface of the mounting system depicted in FIG. 1.

FIG. 25 is a perspective view of the back surface of the mounting system 1 in FIG. 1. The mounting strip 3 has at least one locking flange 63 extending in the longitudinal direction of the mounting strip 3, on its back surface lying opposite the mounting rail 6 additional components 64, 65 of the mounting system can be snapped directly in place, or can be attached indirectly using an adapter element 66 (FIG. 27) that can be snapped in place on locking flange 63.

Figure 26:
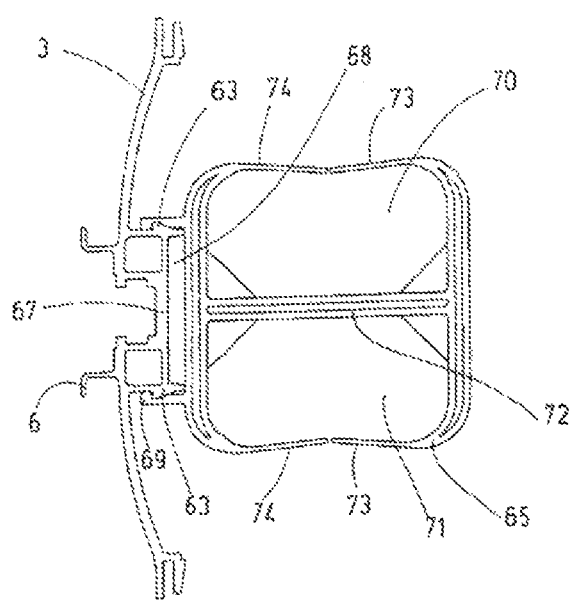
FIG. 26 is a side view of a mounting strip from FIG. 25.

FIG. 26 is a side view of the mounting strip 3 in FIG. 25. The mounting strip 3 has two parallel locking flanges 63 on the back surface thereof, in its central region. The free ends of the locking flanges 63 protrude with respect to a connecting strip 67, and thereby border a groove 68, or a receiving space, respectively, in which, by way of example, either the mounting bracket 5 can be inserted, or a fastening element can engage. The fastening element can be for connecting an additional component 64 to the adapter element 66, for example. The locking flanges 63 are formed as an integral part of the mounting strip 3.

The locking flanges 63 have a self-locking locking edge 80 (FIG. 32), in particular a locking edge 80 having an undercut 81. The two locking flanges 63 are spaced apart from one another, but parallel to one another in the region of the mounting rail 6 disposed on the front surface. A first additional component 65 is snapped in place on the locking flanges 63 for bundling connection lines 34, 35 extending on the back surface of the mounting strip 3 for the device 2 disposed on the front surface. Aside from a connecting section 69 that can be snapped onto the locking flange 3, the component 65 has two cable guides 70, 71 for receiving the connection lines 34, 35. The cable guides 70, 71 are symmetrical to a central plane, as is likewise the case with the double walled separating wall 72. The cable guides 70, 71 can each be accessed from the outside via two resilient, deflectable legs 73, 74. The legs 73, 74 are disposed on opposing sides, which border the connecting section 69.

Figure 27:
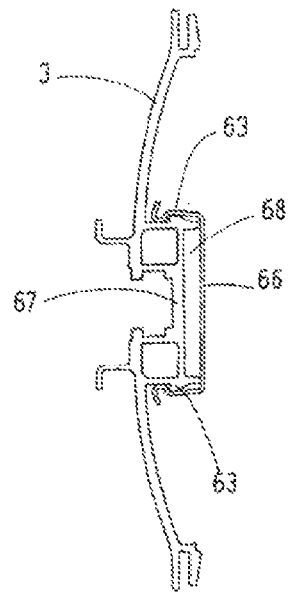
FIG. 27 is a side view of the mounting strip of FIG. 25 with an adapter element snapped onto the locking flange.
Figure 28:
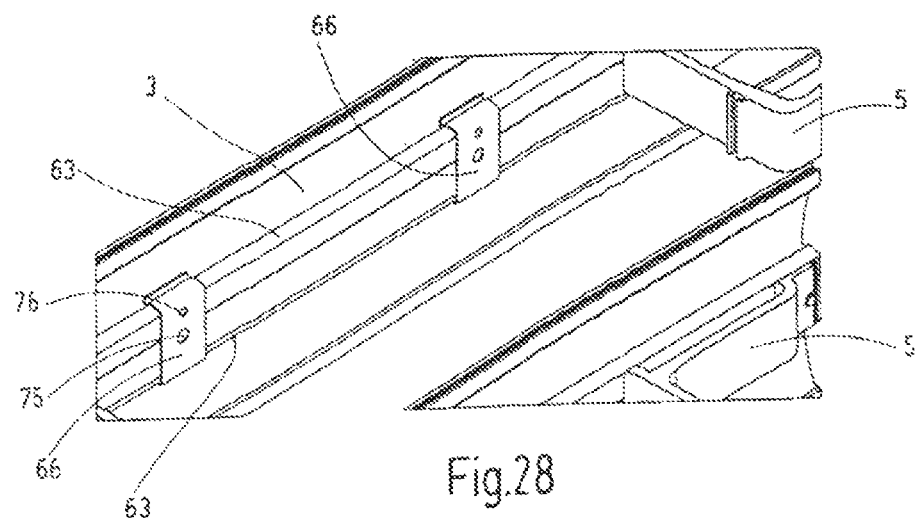
FIG. 28 is a perspective view of the back surface of the mounting strip of FIG. 25, with two adapter elements snapped thereon.

FIG. 27 shows a side view of a mounting strip 3 with an adapter element 66 snapped onto the locking flange 63. FIG. 28 shows a perspective view of the back surface of the mounting strip 3 with two adapter elements 66 snapped in place thereon. The adapter element 66 has a hole 75, preferably disposed centrally thereon, which can be designed as a threaded hole, or can have a threading rolled thereonto, a threaded passage, an insert nut, or suchlike, and one or more, preferably eccentrically disposed, additional holes 76, which can form a mechanical interface for attachment of additional components of the mounting system 1 on the back surface of the mounting strip 3. The additional holes 76 can, for example, form positioners for the attachment of additional components, such as for placing an associated positioners for the additional components, for example. The holes 75, 76 correspond to the receiving space 68 bordered by the adapter element 66, the two locking flanges 63 and the connecting strip 67.

Figure 29:
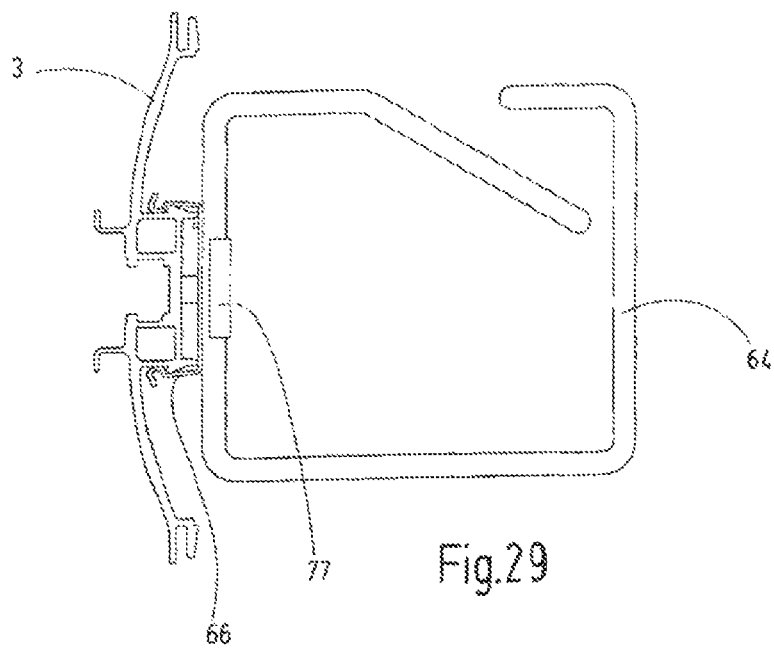
FIG. 29 is a side view of a second additional component of the mounting system according to an exemplary embodiment of the invention.

FIG. 29 shows a second additional component 64 of the mounting system 1, which is an additional bundling element for bundling power lines 34, 35. The second additional component 64 is a two-track bent wire component, which is attached in a clamping manner to the adapter element 66 by a fastening element 77 screwed to the adapter element 66. By partial loosening of the fastening element 77, the second additional component 64 is still retained, but can be moved in relation to the adapter element 66 along the two parallel wire tracks, and subsequently clamped down again. The desired position of the second additional component 64 in relation to the adapter element 66 secured to the locking flanges 63, or the mounting strip 3, respectively, can then be adjusted.

Figure 30:
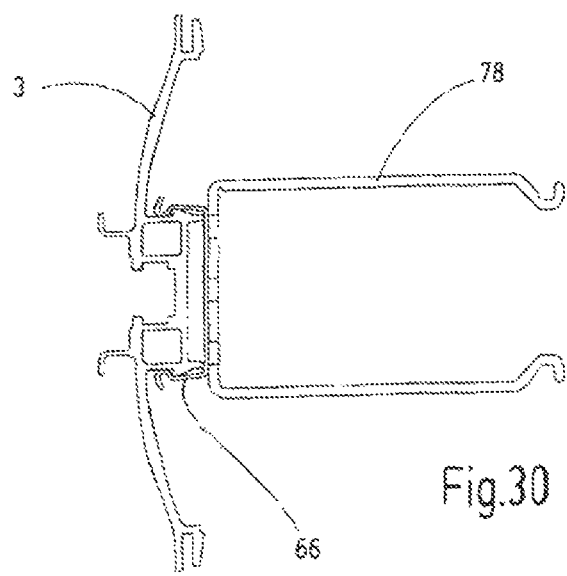
FIG. 30 is a side view of the mounting strip with a cable channel attached to the back surface by adapter elements according to an exemplary embodiment of the invention.

FIG. 30 shows a side view of the mounting strip 3 with a cable channel 78 snapped onto the back surface by the adapter element 66 on the mounting strip 3.

FIG. 31 shows a perspective view of another embodiment example of a mounting system 101, in which at least one mounting strip 403 is connected, at or near to its two ends, in each case, to a vertical profile bar 4 by a connecting element 79. The connecting element 79 is formed thereby from a section of a profile, from which the profile bar 4 is also produced. Alternatively, some other spacing piece can also be used, such as a profile piece having smaller cross-section dimensions, for example, or even a rod cut to the length of the desired spacing of the mounting strip 403 to the profile bar 4. The head 55 of the screw, which screw connects the mounting strip 403 to the connecting element 79, is engulfed in the groove 54 in the sliding nut channel 57.

FIG. 32 shows a side view of another exemplary embodiment example of a mounting strip 503, which can be attached to a profile bar 4 by a connecting element 79. The connecting element 79, preferably having a square cross section. The square cross section has an edge length that corresponds to the spacing of the two locking flanges 63, or is slightly smaller, such that the locking flanges 63 form a guide for form-locking connection when the connecting element 79 is inserted in the receiving space 68 (FIG. 27) bordered by the locking flanges 63. Even when some other spacing piece is used in place of the connecting element 79, advantageously this spacing piece also forms a form-locking connection with the locking flanges 63, such as in the case of a spacing rod having a round cross-section, or rounded corners. For example, if this spacing piece has two opposing flat surfaces, at least on its end section facing the mounting strip 503, the spacing of which to one another corresponds to the spacing of the locking flanges 63.

The mounting strip 503, like the exemplary embodiments described above, has a receiving device 120 for organizer 8 or additional components 10, as well as a sliding nut channel 57 with a groove 54. The mounting strip 503 does not have a mounting rail 6. Instead, the devices 2 are attached to the mounting strip 503 by screws, which can be screwed into nuts that are disposed and can be displaced in the sliding nut channel 57. The sections of the mounting strip 503 adjoining both sides of the sliding nut channel 57 are planar, for example for an attachment having a large surface area, of the device 2 that is to be attached thereto. The ends of the planar sections facing away from the sliding nut channel 57 are bent upward at a right angle. Each end forms, in a receiving device 120, which is set back in relation to the planes defined by the planar sections.

FIG. 33 shows a side view of another embodiment example of a mounting strip 603, which can be connected to a profile bar 4 by a connecting element 79. The mounting strip 603 has a convex curvature on its front surface, on which, at the apex thereof, a mounting rail 6 is disposed. While the mounting rail 6, and also the sliding nut channel 57 with the groove 54, are symmetrical to a central plane 40, the profile of the mounting strip 603 is not symmetrical to this central plane 40. The second section 142, adjoining the mounting rail 6 on one side and ending at the receiving device 120, has a greater extension in the lateral direction than the second section 242 adjoining the mounting rail on the other side. In contrast to this, the vertical distance 44 spanned by the two second sections 142, 242 is consistent or equal.

While various embodiments have been chosen to illustrate the invention, it will be understood by those skilled in the art that various changes and modifications can be made therein without departing from the scope of the invention as defined in the claims.

The invention claimed is:

1. A mounting system for arranging electrical devices in electrical enclosures, the mounting system comprising:
   a mounting strip including a front surface on which an electrical device is capable of being attached and including a back surface with a first locking flange lying opposite the electrical device, said first locking flange extending in a longitudinal direction on said mounting strip;
   a first additional component snapped in place directly on said first locking flange or attached indirectly using an adapter snapped in place on said first locking flange, said first additional component having plural separated cable guides capable of receiving and bundling connection lines of said electrical device extending on said back surface of said mounting strip and being integral parts of said first additional component, said cable guides being disposed symmetrical to a plane of symmetry of said mounting strip.

2. A mounting system according to claim 1 wherein said locking flange is an integral part of said mounting strip.

3. A mounting system according to claim 1 wherein said locking flange comprises a self-locking locking edge with an undercut.

4. A mounting system according to claim 1 wherein said mounting strip comprises a second locking flange at a lateral spacing from said first locking flange relative to a longitudinal axis of said mounting strip, said first and second locking flanges extending parallel to one another, said additional component or adapter being snapped in place in a manner of a clamp with said first and second locking flange.

5. A mounting system according to claim 4 wherein said additional component or adapter encompasses said locking flanges.

6. A mounting system according to claim 4 wherein said first and second locking flanges are symmetrical to said plane of symmetry; and
a mounting rail is on said front surface of said mounting strip and is symmetrical to said plane of symmetry.

7. A mounting system according to claim 6 wherein said plane of symmetry is a central plane of said mounting strip.

8. A mounting system according to claim 6 wherein a sliding nut channel is disposed on said front surface of said mounting strip.

9. A mounting strip according to claim 4 wherein a sliding nut channel is disposed on said front surface of said mounting strip.

10. A mounting system according to claim 1 wherein each of said cable guides is bordered by a resilient and deflectable leg capable of allowing insertion and retention of at least one of the connecting lines in the respective cable guide by deflection of the respective leg.

11. A mounting system according to claim 10 wherein said legs with portions of said first additional component circumferentially enclose said cable guides.

12. A mounting system according to claim 1 wherein an adapter element is snapped onto said first locking flange and comprises a mechanical interface attachable to other additional components on said back surface of said mounting strip.

13. A mounting system according to claim 1 wherein said guides have passageways extending therethrough parallel to a longitudinal axis of said mounting strip.

14. A mounting system according to claim 1 wherein said cable guides are circumferentially closed.

15. A mounting system according to claim 1 wherein said mounting strip is horizontally attached adjacent longitudinal ends to vertical bars by mounting brackets; and
said first additional component is spaced from and between said mounting brackets.

* * * * *